United States Patent
Park

(10) Patent No.: US 11,650,136 B2
(45) Date of Patent: May 16, 2023

(54) APPARATUS AND METHOD FOR INSPECTING SEAT MOTOR NOISE

(71) Applicants: HYUNDAI MOTOR COMPANY, Seoul (KR); KIA MOTORS CORPORATION, Seoul (KR)

(72) Inventor: Ki Won Park, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 182 days.

(21) Appl. No.: 17/175,308

(22) Filed: Feb. 12, 2021

(65) Prior Publication Data
US 2022/0107243 A1 Apr. 7, 2022

(30) Foreign Application Priority Data
Oct. 5, 2020 (KR) .................. 10-2020-0127778

(51) Int. Cl.
| | |
|---|---|
| *G01M 99/00* | (2011.01) |
| *G01H 17/00* | (2006.01) |
| *B60N 2/02* | (2006.01) |
| *G06K 19/077* | (2006.01) |
| *G10L 25/51* | (2013.01) |
| *G10K 11/16* | (2006.01) |
| *H04R 1/08* | (2006.01) |

(52) U.S. Cl.
CPC .......... *G01M 99/005* (2013.01); *B60N 2/0232* (2013.01); *G01H 17/00* (2013.01); *G06K 19/07758* (2013.01); *G10K 11/16* (2013.01); *G10L 25/51* (2013.01); *H04R 1/08* (2013.01)

(58) Field of Classification Search
None
See application file for complete search history.

(56) References Cited

FOREIGN PATENT DOCUMENTS

| | | | |
|---|---|---|---|
| KR | 101613898 | * | 4/2016 |
| KR | 101613898 B1 | | 4/2016 |
| KR | 101793645 | * | 11/2017 |
| KR | 101793645 B1 | | 11/2017 |
| TW | 754384 B1 | * 2/2022 | ............... G01H 3/00 |
| TW | 1754384 B | * | 2/2022 |

* cited by examiner

*Primary Examiner* — Raul J Rios Russo
*Assistant Examiner* — Carl F. R. Tchatchouang
(74) *Attorney, Agent, or Firm* — Lempia Summerfield Katz LLC

(57) ABSTRACT

An apparatus for inspecting seat motor noise includes: a soundproof booth provided on a transfer path of a seat assembly and installed with an opening/closing door at both sides along a transfer direction of the seat assembly; a power supply portion provided within the soundproof booth and configured to apply power to respective seat motors of the seat assembly; a noise detection unit installed within the soundproof booth and configured to detect an operation noise of the seat motors; and a controller configured to determine whether the seat motors are defective in noise based on comparison of noise data detected by the noise detection unit to predetermined reference data.

17 Claims, 12 Drawing Sheets

APPARATUS AND METHOD FOR INSPECTING SEAT MOTOR NOISE

CROSS-REFERENCE TO RELATED APPLICATION

This application claims priority to and the benefit of Korean Patent Application No. 10-2020-0127778 filed in the Korean Intellectual Property Office on Oct. 5, 2020, the entire contents of which are incorporated herein by reference.

BACKGROUND

(a) Field of the Disclosure

The disclosure relates to manufacturing of a vehicle seat.

(b) Description of the Related Art

In general, a vehicle seat is provided with various convenience devices such as a reclining device, a back-and-forth sliding device, a height adjusting device, a tilting device, and a ventilation device. Seats employing such convenience devices are mounted on vehicles through various inspection processes after the assembly process.

The seat inspection process includes the process of diagnosing noise generated by motors of convenience devices and inspecting the seat defects due to the noise.

However, in the conventional seat motor noise inspection process, noise inspection of the seat motor is performed by auditory inspection by a worker, or by manually attaching a vibration sensor by a worker.

The above information disclosed in this Background section is only to enhance understanding of the background of the present disclosure, and therefore it may contain information that does not form the prior art that is already known in this country to a person of ordinary skill in the art.

SUMMARY

An apparatus is provided for inspecting seat motor noise and includes: a soundproof booth provided on a transfer path of a seat assembly and installed with an opening/closing door at both sides along a transfer direction of the seat assembly; a power supply portion provided within the soundproof booth and configured to apply power to respective seat motors the seat assembly: a noise detection unit installed within the soundproof booth and configured to detect an operation noise of the seat motors; and a controller configured to determine whether the seat motors are defective in noise based on comparison of noise data detected by the noise detection unit to predetermined reference data.

The noise detection unit may include a microphone positioned at a rear bottom center portion of the seat assembly and configured to obtain the noise data according to the operation of the seat motors. The noise detection unit may also include a vibration sensor configured to contact a lower end central portion of the seat assembly and to acquire vibration data according to the operation of the seat motors.

An apparatus is provided for inspecting seat motor noise and includes: a seat loading jig installed to be movable in an up-down direction in a conveyor moving along a predetermined transfer path, and configured to fixedly holding a seat assembly; a soundproof booth provided at a predetermined section of the transfer path and installed with an opening/closing door at both sides along a transfer direction of the seat assembly; a tag reader installed in a supporting member of the conveyor and configured to receive an output signal of a smart tag attached to the seat loading jig; a supporting frame installed within the soundproof booth at a predetermined interval from the transfer path; a power supply portion installed in the supporting frame to be reciprocally movable along a front-rear direction of the seat assembly, and configured to supply power to seat motors of the seat assembly; a noise detection unit installed in the supporting frame to be reciprocally movable along the front-rear direction of the seat assembly and configured to detect an operation noise of the seat motors; and a controller configured to determine whether the seat motors are defective in noise based on comparison of noise data detected by the noise detection unit to predetermined reference data.

The seat loading jig may be installed on the conveyor to be reciprocally movable in the up-down direction by a first driving portion.

The seat loading jig may include a power supply connector electrically connected to the seat motors of the seat assembly.

The power supply portion may be movable forward and rearward by a second driving portion provided in the supporting frame and may be electrically connected to the power supply connector of the seat loading jig through power supply pins.

The noise detection unit may include a microphone provided to be reciprocally movable along direction perpendicular to the transfer path and configured to obtain the noise data according to the operation of the seat motors at a rear bottom center portion of the seat assembly The noise detection unit may also include a vibration sensor provided to be reciprocally movable along the transfer path and configured to contact a lower end central portion of the seat assembly and to acquire vibration data according to the operation of the seat motors.

The noise detection unit may include: a movable frame installed in the supporting frame to be reciprocally movable along direction perpendicular to the transfer path by a third driving portion; a first supporting rod fixedly installed to the movable frame; a microphone fixedly installed to an end of the first supporting rod; a pair of second supporting rods installed at both sides of the movable frame interposing the first supporting rod to be reciprocally movable in a direction to become away from or closer to each other along the transfer path by a fourth driving portion; and a vibration sensor installed to an end of the second supporting rod.

The vibration sensor may be installed at the end of the second supporting rod to be reciprocally movable in the up-down direction by a fifth driving portion.

The supporting frame may include a supporting leg configured to support a bottom of the soundproof booth and a vibration-proof rubber block provided at the supporting leg.

A method is provided for inspecting seat motor noise of a seat assembly being transferred in a line along a predetermined transfer path. The method includes: inserting at least one seat assembly into a soundproof booth, the seat assembly being loaded on a seat loading jig and being transferred together with the seat loading jig along the predetermined transfer path through a conveyor; moving a power supply portion forward toward the seat assembly to supply power to seat motors of the seat assembly; moving a noise detection unit toward the seat assembly to detect an operation noise of respective seat motors and outputting noise data to a controller; and determining whether the seat motors are defective in noise based on comparison of the noise data to predetermined reference data.

In the inserting of the at least one seat assembly into a soundproof booth, a smart tag storing vehicle type information may be attached to the seat loading jig.

In the inserting of the at east one seat assembly into a soundproof booth, a wireless signal output from the smart tag may be received and may be output to the controller by a tag reader provided at a supporting member of the conveyor.

When the seat assembly loaded on the seat loading jig corresponds to a vehicle type to be inspected, which is analyzed by the controller based on the wireless signal, the transfer of the seat loading jig may be stopped, both opening/closing doors of the soundproof booth may be closed, and the seat loading jig may be moved upward.

In the moving of the power supply portion, the power supply portion may be connected to a power supply connector of the seat loading jig electrically connected to the seat motors of the seat assembly.

In the moving of the noise detection unit, a microphone of the noise detection unit may be positioned to a rear bottom center portion of the seat assembly to obtain the noise data according to the operation of the seat motors and then the noise data may be output to the controller.

In the moving of the noise detection unit, a vibration sensor of the noise detection unit may contact each of both lower end central portions of the seat assembly to acquire vibration data according to the operation of the seat motors. The vibration data may then be output to the controller.

In the determining of whether the seat motors are defective, whether the seat motors are defective in noise may be displayed through a display.

According to an embodiment, since seat motor noise inspection for the seat assembly of a driver seat and a passenger seat may be simultaneously performed in line, the cycle time for seat production may be decreased. Further, motor noise defects of the seat assembly may be minimized, thereby reducing claim cost due to seat motor noise.

Other effects that may be obtained or are predicted by an embodiment are explicitly or implicitly described in the below detailed description of the present disclosure. In other words, various effects that are predicted according to an embodiment are described in the following detailed description.

BRIEF DESCRIPTION OF THE DRAWINGS

The drawings are intended to be used as references for describing the specific embodiments of the present disclosure. The accompanying drawings should not be construed as limiting the technical spirit of the present disclosure.

DETAILED DESCRIPTION OF THE EMBODIMENTS

Figure 1:
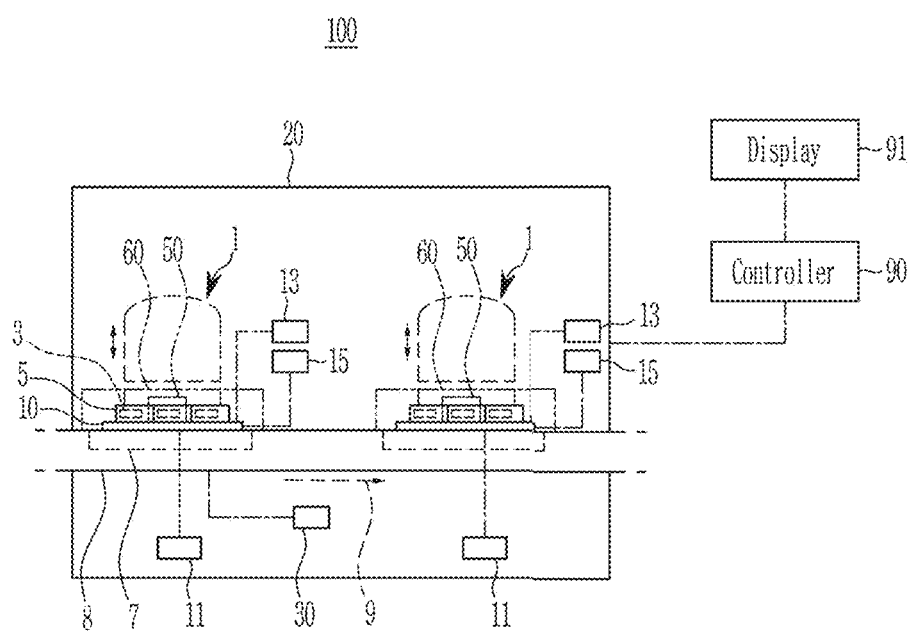
FIG. 1 is a block diagram illustrating an apparatus for inspecting seat motor noise according to an embodiment.

The present disclosure is described more fully hereinafter with reference to the accompanying drawings, in which embodiments of the disclosure are shown. As those having ordinary skill in the art should realize, the described embodiments may be modified in various different ways, all without departing from the spirit or scope of the present disclosure.

In order to clarify the present disclosure, parts that are not related to the description have been omitted. Also, the same elements or equivalents are referred to with the same reference numerals throughout the specification.

Also, the size and thickness of each element are arbitrarily shown in the drawings, but the present disclosure is not necessarily limited thereto. Also, in the drawings, the thickness of layers, films, panels, regions, etc., may be exaggerated for clarity.

In addition, in the following description, dividing names of components into first, second, and the like is to distinguish the names because the names of the components are otherwise the same as each other. An order thereof is not particularly limited.

In addition, unless explicitly described to the contrary, the word "comprise" and variations such as "comprises" or "comprising", should be understood to imply the inclusion of stated elements but not the exclusion of any other elements.

Furthermore, each of terms, such as " . . . unit", " . . . means", " . . . part", and " . . . member" described in the specification, means a unit of a comprehensive element that performs at least one function or operation. When a unit, means, member, part, or the like of the present disclosure is described as having a purpose or performing an operation, function, or the like, the unit, means, member, or part should be considered herein as being "configured to" meet that purpose or to perform that operation or function. Further, the controller described herein may include a processor programmed to perform the noted operation or function.

FIG. 1 is a block diagram illustrating an apparatus for inspecting seat motor noise according to an embodiment.

Referring to FIG. 1, an apparatus 100 for inspecting seat motor noise according to an embodiment may be applied to a seat assembling system for manufacturing a seat assembly 1, which may be a driver seat and/or a passenger seat, in the process of assembling assembly components of a vehicle.

Here, the seat assembly 1 applied to an embodiment includes various convenience devices connected to a seat cushion, such as a reclining device, a back-and-forth sliding device, a height adjusting device, a tilting device, and a ventilation device. Furthermore, the seat assembly 1 is equipped with a movable module 5 having a plurality of seat motors 3 for activating the convenience devices, under the seat cushion.

Various component parts have been assembled in the seat assembly section in the seat assembly 1. The seat assembly 1 may be transferred to an inspection section provided with an apparatus 100 for inspecting seat motor noise according to an embodiment along a predetermined transfer path 9 by a conveyor 7.

The conveyor 7 is provided to be able to run along the transfer path 9 over a conveyor support 8. The conveyor 7 may be driven along the transfer path by a conveyor driving unit (not shown) of a conventional art.

Hereinafter, based on transfer direction of the seat assembly 1 transferred along a predetermined transfer path 9, a direction that is horizontal and perpendicular to the transfer direction is referred to as a front-rear direction, a height direction of the seat assembly 1 is referred to as an up-down direction.

In addition, hereinafter, an "end (one end, another end, and the like)" may be defined as any one end or may be defined as a portion (one end portion, another end portion, and the like) including that end.

An apparatus 100 for inspecting seat motor noise according to an embodiment is arranged in a line for transferring the seat assembly 1 assembled in the seat assembly process along the transfer path. The apparatus 100 is formed as a structure that is capable of automatic inspection of an operation noise of the seat motors 3.

Figure 2:
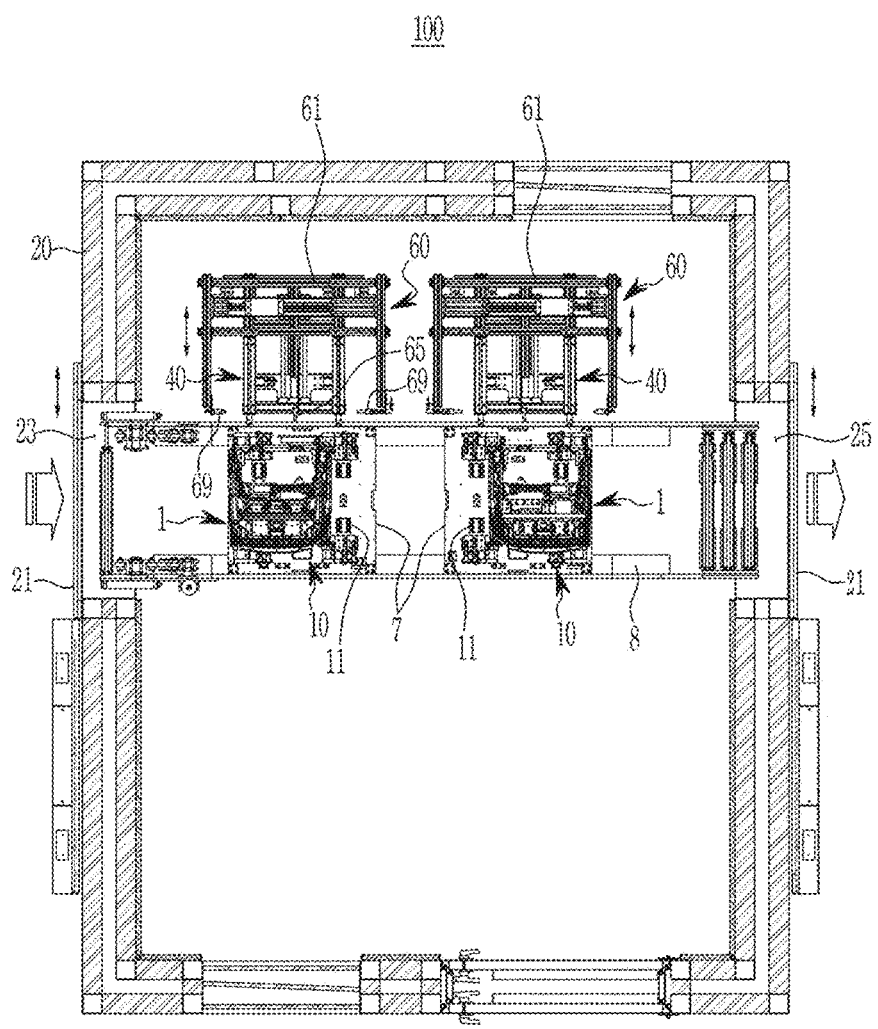
FIG. 2 is a plan schematic diagram illustrating an apparatus for inspecting seat motor noise according to an embodiment.
Figure 3:
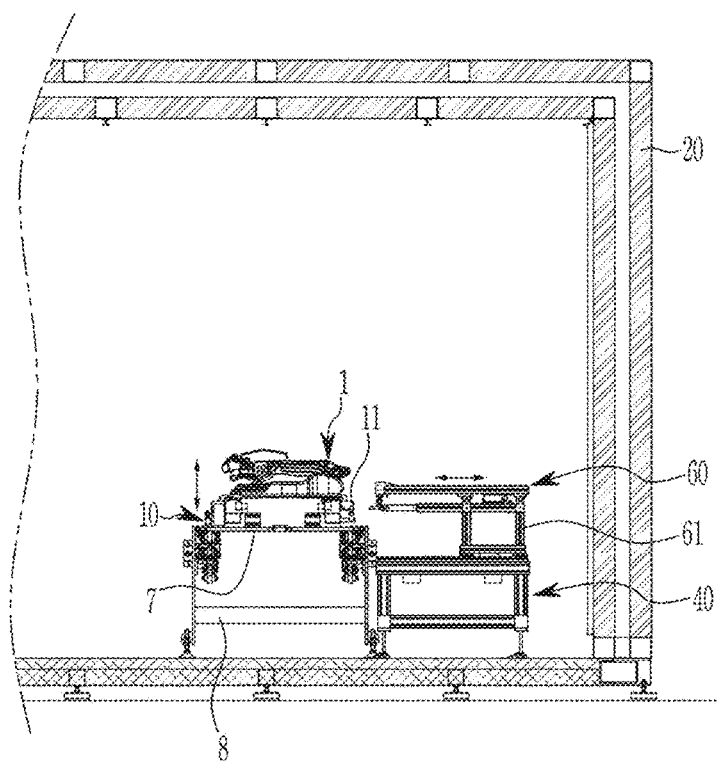
FIG. 3 is a side schematic diagram illustrating an apparatus for inspecting seat motor noise according to an embodiment.

FIG. 2 is a plan schematic diagram illustrating an apparatus for inspecting seat motor noise according to an embodiment. FIG. 3 is a side schematic diagram illustrating an apparatus for inspecting seat motor noise according to an embodiment.

Referring to FIG. 1-FIG. 3, an apparatus 100 for inspecting seat motor noise according to an embodiment includes, a seat loading jig 10, a soundproof booth 20, a tag reader 30, a supporting frame 40, a power supply portion 50, a noise detection unit 60, and a controller 90.

In an embodiment, the seat loading jig 10 is configured to fix (regulate) the seat assembly 1 of a vehicle type to be inspected and is installed in the conveyor 7.

The seat loading jig 10 aligns the seat assembly 1 transferred by, e.g., a robot, by using an aligning device such as a locator, and may fix the seat assembly 1 by using a regulating device such as a clamp.

The seat loading jig 10 is installed to be reciprocally movable in the up-down direction by a first driving portion 11 on the conveyor 7. In other words, the seat loading jig 10 may move the seat assembly 1 in the up-down direction by the first driving portion 11. Here, the first driving portion 11 may be a servo-motor or operation cylinder as known in the art.

In addition, the seat loading jig 10 is attached with a smart tag 13. The smart tag 13 may include, e.g., a radio frequency identification (RFID) tag. The smart tag 13 transmits a wireless signal that stores vehicle type information of the vehicle on which the seat assembly 1 is to be mounted.

Furthermore, the seat loading jig 10 includes a power supply connector 15 that is electrically connected to the seat motors 3 of the seat assembly 1. The power supply connector 15 may be electrically connected to a terminal assembly connected to the seat motors 3 when the seat assembly 1 is loaded on the seat loading jig 10.

In an embodiment, the soundproof booth 20 functions to block external noise to inspect the motor noise of the seat assembly 1 and is provided in a predetermined section of the transfer path 9.

The soundproof booth 20 forms a soundproof space through which the conveyor 7 traveling along the transfer path 9 may pass. An opening/closing door 21 is installed on both sides along the transfer direction of the seat assembly 1. The opening/closing door 21 at a first side may open or close a seat inlet 23 of the soundproof booth 20 and the opening/closing door 21 at a second side may open or close a seat outlet 25 of the soundproof booth 20.

Here, a pair of seat assemblies 1 loaded on a pair of seat loading jigs 10 may be inserted into the soundproof space of the soundproof booth 20 through the seat inlet 23. The pair of seat assemblies 1 are, for example, a driver seat and a passenger seat mounted on the vehicle type to be inspected.

In an embodiment, the tag reader 30 receives an output signal of the smart tag 13 attached to the seat loading jig 10 and is installed on the conveyor support 8 mentioned above.

The tag reader 30 is to identify whether the seat assembly 1 loaded in the seat loading jig 10 corresponds to the vehicle type to be inspected or not. The tag reader 30 receives a wireless signal transmitted from the smart tag 13 through an antenna (not shown) and may output a wireless signal to the controller 90, which is described later.

In an embodiment, the supporting frame 40 is to be installed with various constituent elements that are described further below and is provided at a bottom of the soundproof booth 20. The supporting frame 40 may be formed as a single frame or two or more frames connected to each other.

In addition, the supporting frame 40 may include various accessory elements such as brackets, bars, rods, plates, blocks, ribs, collars, and the like for supporting various constituent elements.

The accessory elements are for installing each constituent element to the supporting frame 40, which are described further below. In an embodiment, the above accessory elements may be collectively referred to as the supporting frame 40, except in exceptional cases.

The supporting frame 40 is disposed at a predetermined interval from the transfer path 9 along the front-rear direction of the seat assembly 1 in the soundproof booth 20. The supporting frame 40 includes a plurality of supporting legs 41 supporting an inner bottom of the soundproof booth 20. The supporting leas 41 support the inner bottom of the soundproof booth 20 through a vibration-proof rubber block 43.

Figure 4:
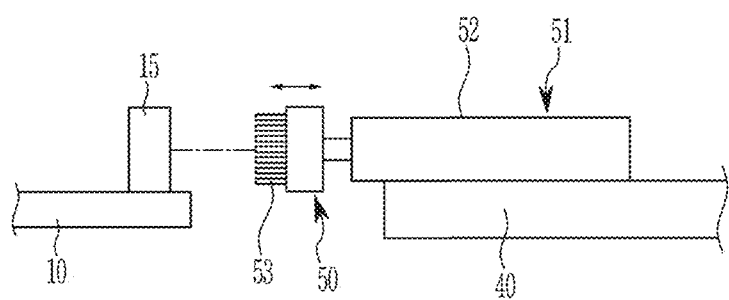
FIG. 4 illustrates a power supply portion applied to an apparatus for inspecting seat motor noise according to an embodiment.

In an embodiment, the power supply portion 50 is for driving the seat motors 3 by applying a power to the movable module 5 of the seat assembly 1. As shown in FIG. 4, the power supply portion 50 is installed in the supporting frame 40, to be reciprocally movable along the front-rear direction of the seat assembly 1.

The power supply portion 50 is installed to be movable forward and rearward along the front-rear direction of the seat assembly 1 by a second driving portion 51 provided in the supporting frame 40. The second driving portion 51 may include an operation cylinder 52 fixedly installed in the supporting frame 40 along the front-rear direction of the seat assembly 1.

The power supply portion 50 includes power supply pins 53. The power supply portion 50 is installed to be movable forward and rearward by the second driving portion 51 and may be electrically connected to the power supply connector 15 of the seat loading jig 10 through the power supply pins 53.

Referring to FIG. 1-FIG. 3, in an embodiment, the noise detection unit 60 is for detecting operation noise of the seat motors 3 operated by power supplied by the power supply portion 50. The noise detection unit 60 is installed in the supporting frame 40 to be reciprocally movable along the front-rear direction of the seat assembly 1.

Figure 5:
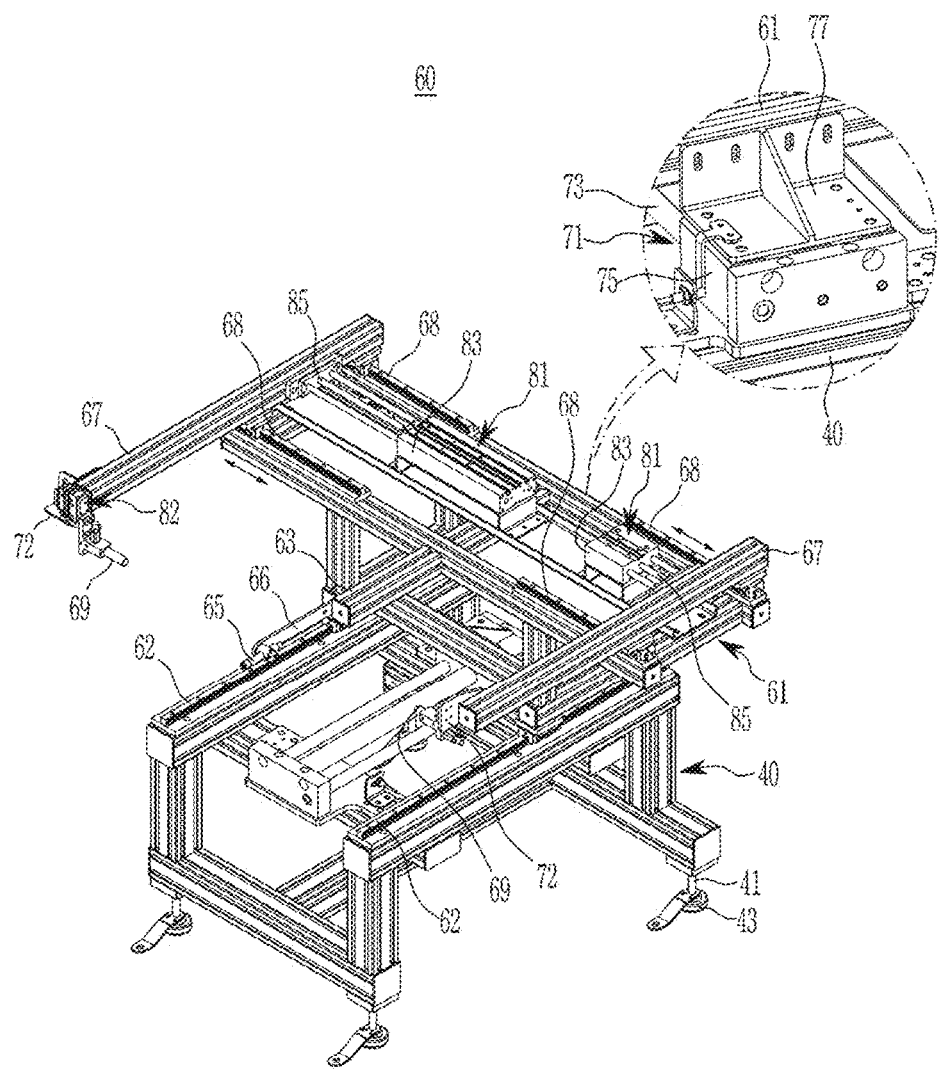
FIG. 5 and FIG. 6 illustrate a noise detection unit applied to an apparatus for inspecting seat motor noise according to an embodiment.
Figure 6:
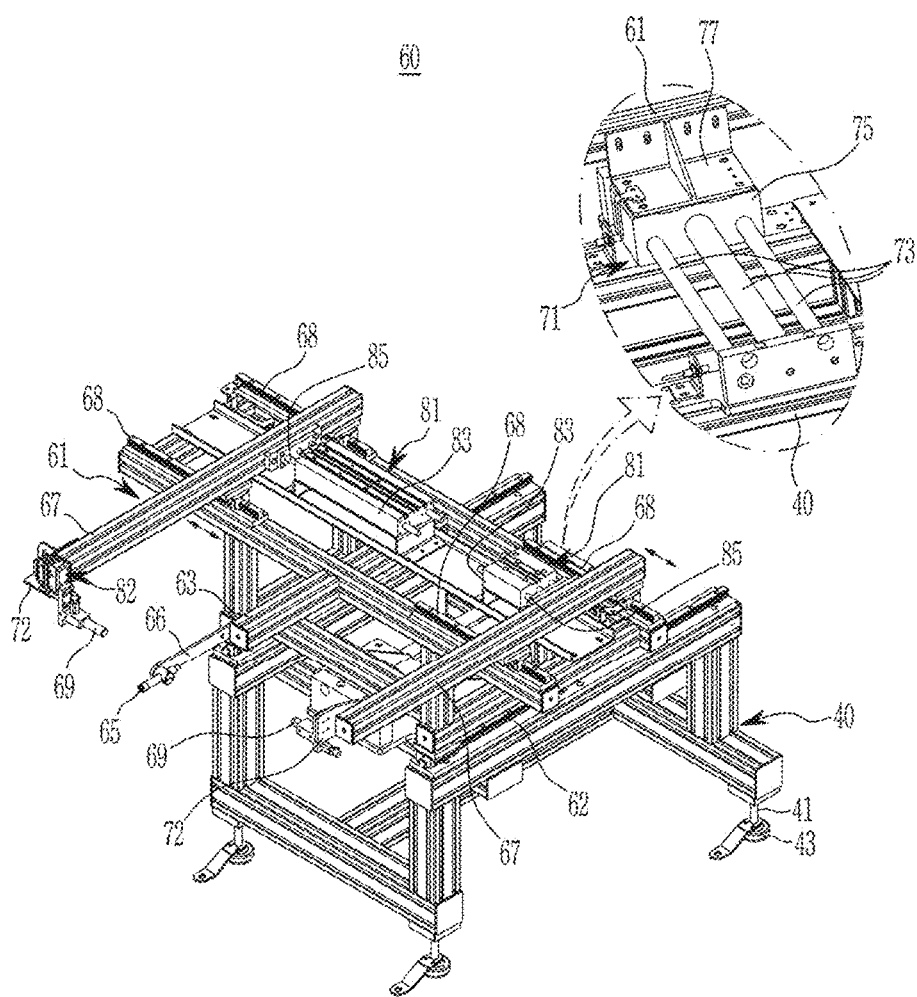

FIG. 5 and FIG. 6 illustrate a noise detection unit applied to an apparatus for inspecting seat motor noise according to an embodiment.

Referring to FIG. 5 and FIG. 6, the noise detection unit 60 according to an embodiment includes a movable frame 61, a first supporting rod 63, a microphone 65, a pair of second supporting rods 67, and a vibration sensor 69.

The movable frame 61 is installed in the supporting frame 40, to be reciprocally movable along the front-rear direction of the seat assembly 1, along direction perpendicular to the transfer path 9. The movable frame 61 may include horizontal frames (X-axis frames) disposed along the transfer path 9, perpendicular frames (Y-axis frames) connected perpendicularly to the horizontal frames, and up-down frames (Z-axis frame) connected to the horizontal frames in the up-down direction.

The movable frame 61 is slidably coupled to a first guide rail 62 provided on both sides of the supporting frame 40. The first guide rail 62 is disposed in the direction perpendicular to the transfer path 9.

Here, the movable frame 61 may reciprocally move along the first guide rail 62 in the front-rear direction of the seat assembly 1 by the operation of a third driving portion 71. The third driving portion 71 may include a linear motor 75 coupled to a plurality of linear guides 73 fixed to the supporting frame 40 to be movable forward and rearward. The linear motor 75 generates a back and forth operational force by a magnet and is connected to the movable frame 61 through a connection bracket 77.

The first supporting rod 63 is fixedly installed to a central portion of the movable frame 61. The first supporting rod 63 is disposed in the front-rear direction of the seat assembly 1, i.e., in the direction perpendicular to the transfer path 9.

The microphone 65 is fixedly installed to a frontal end of the first supporting rod 63 via a first mounting bracket 66. The microphone 65 is positioned at a rear bottom center portion of the seat assembly 1 through the first supporting rod 63, acquires noise data according to the operation of the seat motors 3, and outputs the noise data to the controller 90.

The pair of second supporting rods 67 is installed at both sides of the movable frame 61 interposing the first supporting rod 63 to be reciprocally movable in direction to become away or closer to each other along the transfer path 9.

The pair of second supporting rods 67 are disposed in parallel with the first supporting rod 63, in the front-rear direction of the seat assembly 1 i.e., in the direction perpendicular to the transfer path 9. Such second supporting rods 67 are slidably coupled to a pair of second guide rails 68 provided in the movable frame 61. The second guide rail 68 is disposed in the movable frame 61 along the transfer path 9.

Here, the pair of second supporting rods 67 may each reciprocally move along the second guide rail 68 in the direction of the transfer path 9 by the operation of a fourth driving portion 81. The fourth driving portion 81 may include an operation cylinder 83 fixedly installed to the movable frame 61 along the transfer path 9, which corresponds to the second supporting rod 67. The operation cylinder 83 is connected to the second supporting rod 67 through the operation rod 85.

The vibration sensor 69 is mounted to each frontal end of the second supporting rods 67 through a second mounting bracket 72. The vibration sensor 69 contacts both lower end central portions of the seat assembly 1 (e.g., lower end central portion of seat track rail) through the second supporting rod 67, acquires vibration data according to the operation of the seat motors 3, and outputs the vibration data to the controller 90.

Figure 7:
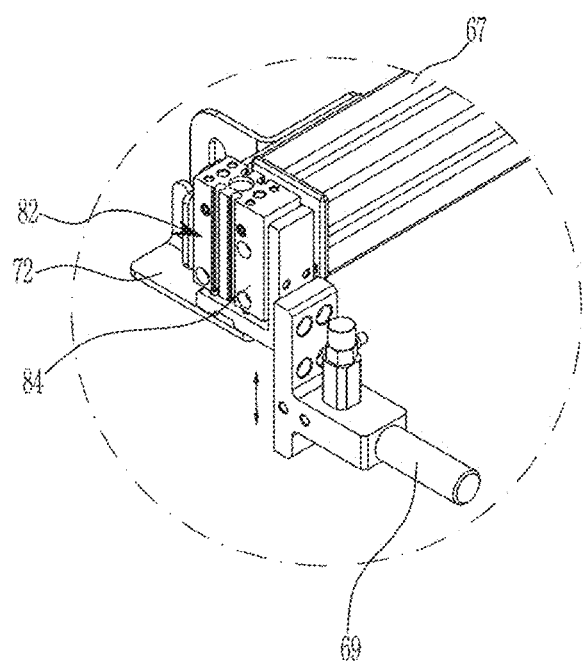
FIG. 7 illustrates a vibration sensor portion of a noise detection unit applied to an apparatus for inspecting seat motor noise according to an embodiment.

Furthermore, as shown in FIG. 7, the vibration sensor 69 may be installed to the front ends of the second supporting rod 67, to be reciprocally movable in the up-down direction by a fifth driving portion 82, for easily contacting both lower end central portions of the seat assembly 1.

The fifth driving portion 82 may include an operation cylinder 84 fixedly installed to the second mounting bracket 72. The operation cylinder 84 is connected to the vibration sensor 69 in the up-down direction.

Referring to FIG. 1, in an embodiment, the controller 90 is a controller that controls the overall operation of an apparatus 100 for inspecting seat motor noise. The controller 90 may be realized as at least one control processor operated by a predetermined program, which may include a set of instructions to enable the controller 90 to perform an method of this disclosure.

Based on a wireless signal provided from the tag reader 30, the controller 90 may control an operation of the conveyor 7, an operation of the opening/closing door 21 of the soundproof booth 20, an operation of the seat loading jig 10, an operation of the power supply portion 50, and an operation of the noise detection unit 60.

In addition, the controller 90 may determine whether the seat motors 3 are defective in noise based on comparison of the noise data detected by the microphone 65 and the vibration sensor 69 of the noise detection unit 60 to predetermined reference data, In addition, the controller 90 may indicate whether the seat motors 3 are defective through a display 91.

Hereinafter, a method for inspecting seat motor noise by utilizing an apparatus 100 for inspecting seat motor noise according to an embodiment is described in detail with reference to the drawings.

Figure 8:
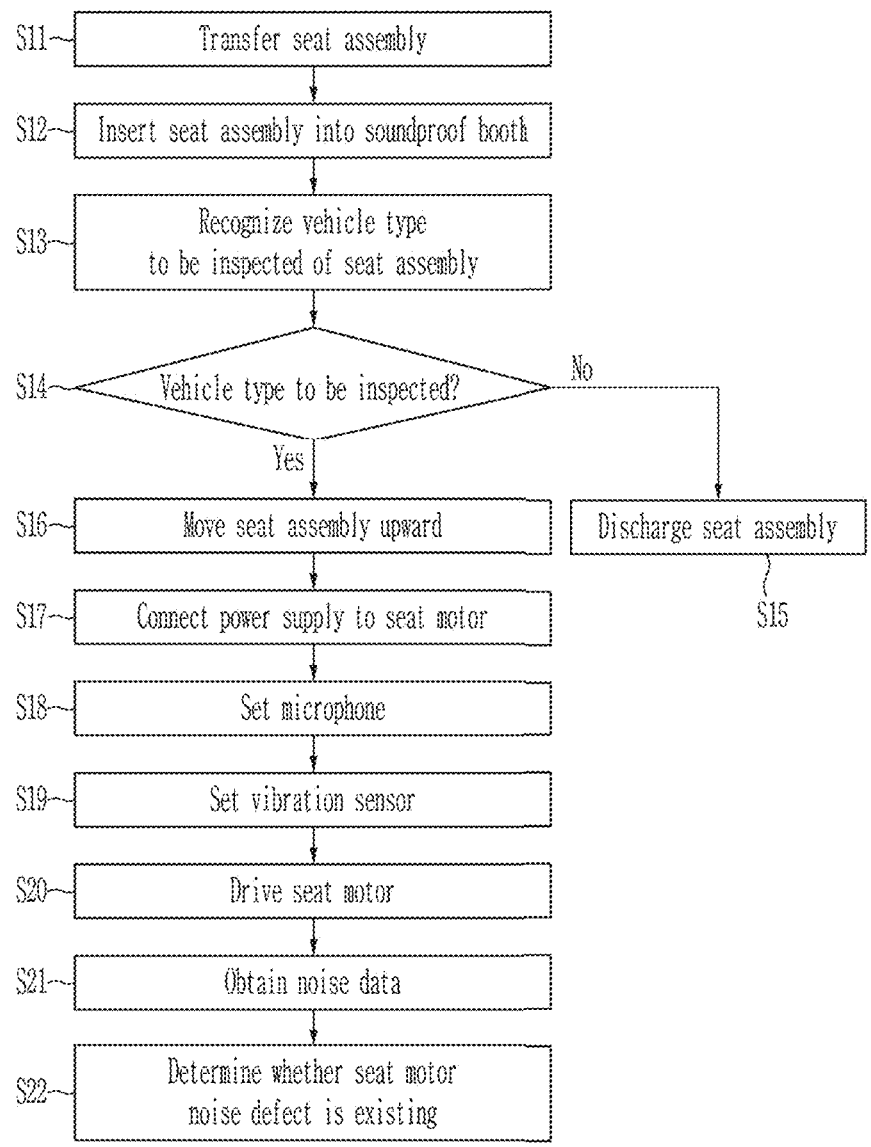
FIG. 8 is a flowchart showing a method for inspecting seat motor noise according to an embodiment.

FIG. 8 is a flowchart showing a method for inspecting seat motor noise according to an embodiment. FIG. 9-FIG. 12 illustrate operation states of an apparatus for inspecting seat motor noise during a method for inspecting seat motor noise according to an embodiment.

Figure 9:
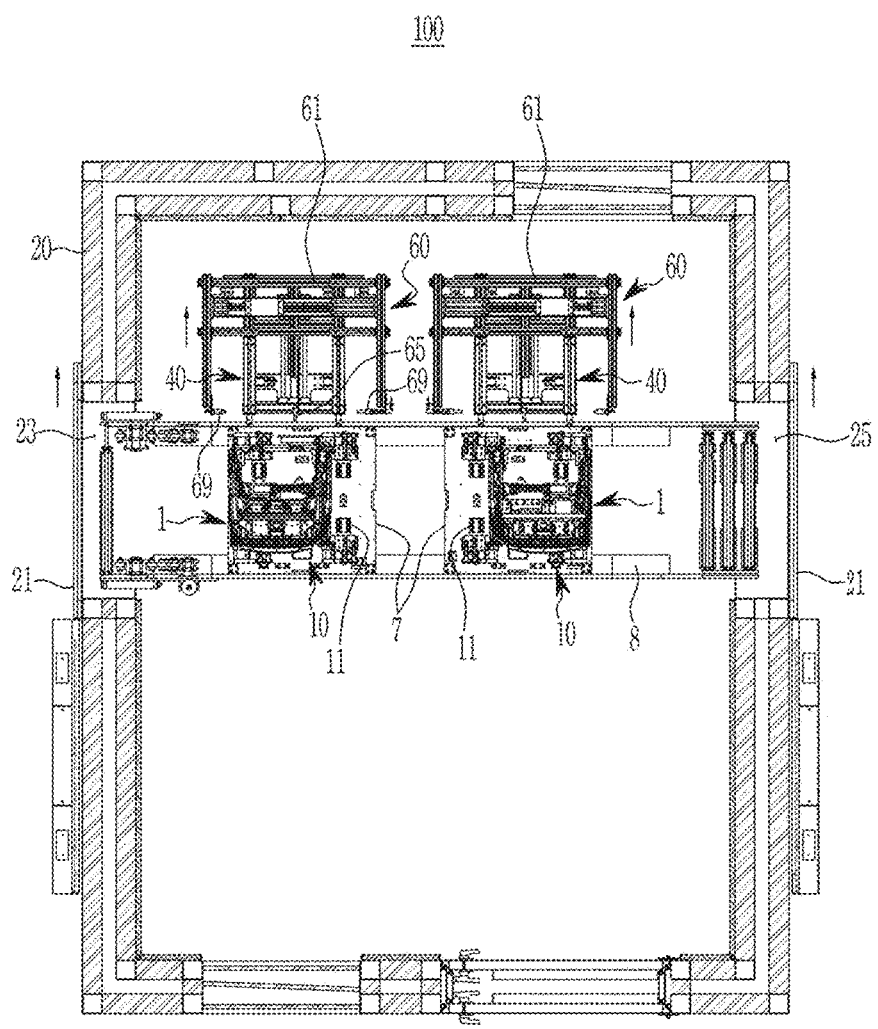
FIG. 9-FIG. 12 illustrate operation states of an apparatus for inspecting seat motor noise during a method for inspecting seat motor noise according to an embodiment.
Figure 10:
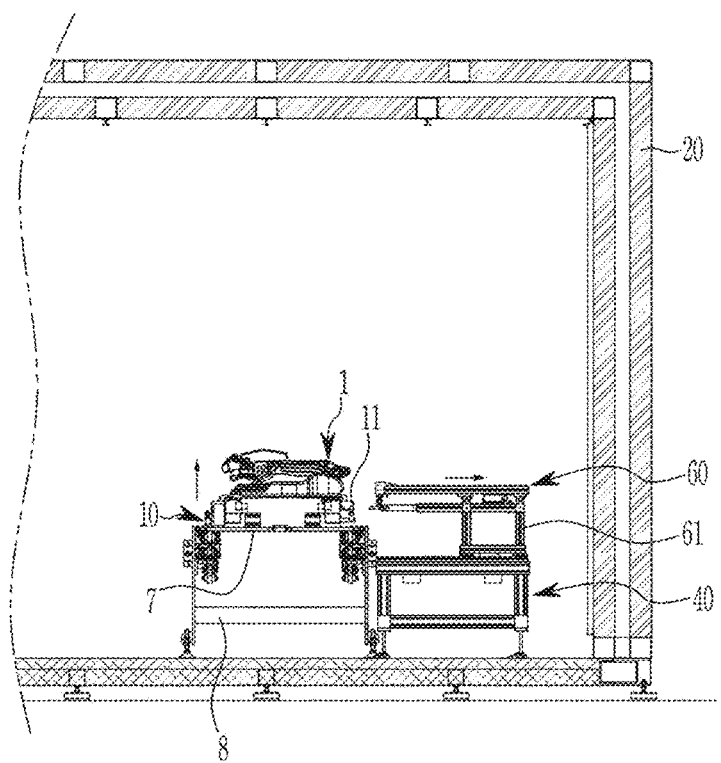

Referring to FIG. 8-FIG. 10, in an embodiment, firstly at step S11, the seat assembly 1 that has been assembled in a seat assembly process is loaded on the seat loading jig 10. The seat loading jig 10 is transferred to the seat noise inspection section along the transfer path 9 by the conveyor 7.

At this time, in an embodiment, the smart tag 13 is attached to the seat loading jig 10, where the smart tag 13 stores the vehicle type information to be inspected in connection with the vehicle on which the seat assembly 1 is to be mounted. During this process, the seat loading jig 10 together with the seat assembly 1 is in the position moved downward by driving the first driving portion 11 and the seat inlet 23 and the seat outlet 25 of the soundproof booth 20 are open by the opening/closing doors 21.

In such a state, subsequently at step S12, the seat assembly 1 transferred along the transfer path 9 via the conveyor 7 while being loaded in the seat loading jig 10 is input into the soundproof space of the soundproof booth 20 through the seat inlet 23.

Here, in an embodiment, a driver seat and a passenger seat as the pair of seat assemblies 1 may be input into the soundproof space of the soundproof booth 20 through the conveyor 7 and the seat loading jig 10.

During this process, the power supply portion 50 inside the soundproof booth 20 is in a state of being moved backward with respect to the seat assembly 1 by the operation of the second driving portion 51. The movable frame 61 of the noise detection unit 60 is also in a state of being moved backward by the third driving portion 71, inside the soundproof booth 20.

Furthermore, when the seat assembly 1 is loaded to the seat loading jig 10, the power supply connector 15 of the seat loading jig 10 is in a state of being electrically connected to the terminal assembly that is connected to the seat motors 3 of the seat assembly 1.

Subsequently at step S13, while the seat assembly 1 is being inserted into the soundproof space of the soundproof booth 20 through the conveyor 7 and the seat loading jig 10 the tag reader 30 receives the wireless signal output from the smart tag 13 and then outputs the wireless signal to the controller 90.

Then, at step S14, the controller 90 analyzes the wireless signal received from the tag reader 30 to determine whether the seat assembly 1 loaded in the seat loading jig 10 corresponds to the vehicle type to be inspected.

When the seat assembly 1 loaded in the seat loading jig 10 does not correspond to the vehicle type to be inspected (S14—No), at step S15, the seat loading jig 10 is continued to be transferred along the transfer path 9 through the conveyor 7 and is discharged to the outside of the soundproof booth 20 through the seat outlet 25.

When the seat assembly 1 loaded in the seat loading jig 10 corresponds to the vehicle type to be inspected (S14—Yes), the transfer of the seat loading jig 10 is stopped, and the seat inlet 23 and the seat outlet 25 of the soundproof booth 20 are closed by the opening/closing doors 21.

Then, at step S16, the seat loading jig 10 together with the seat assembly 1 is moved upward by driving the first driving portion 11.

Figure 11:
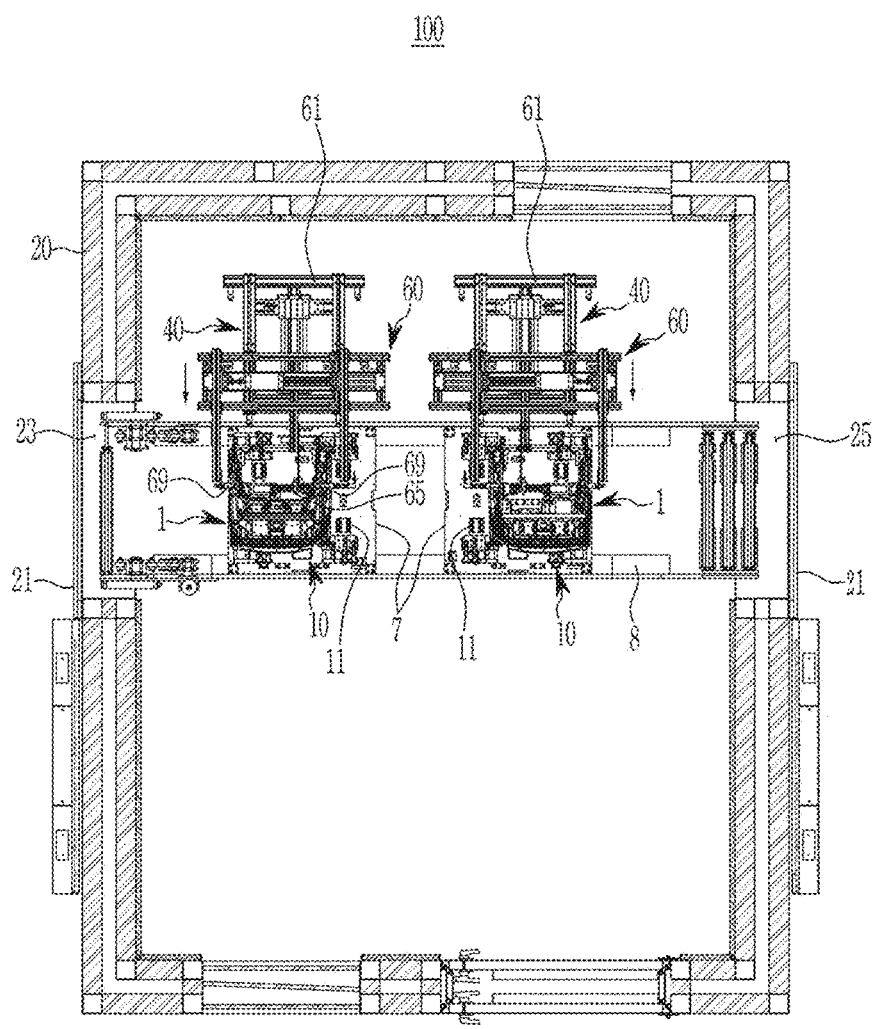
Figure 12:
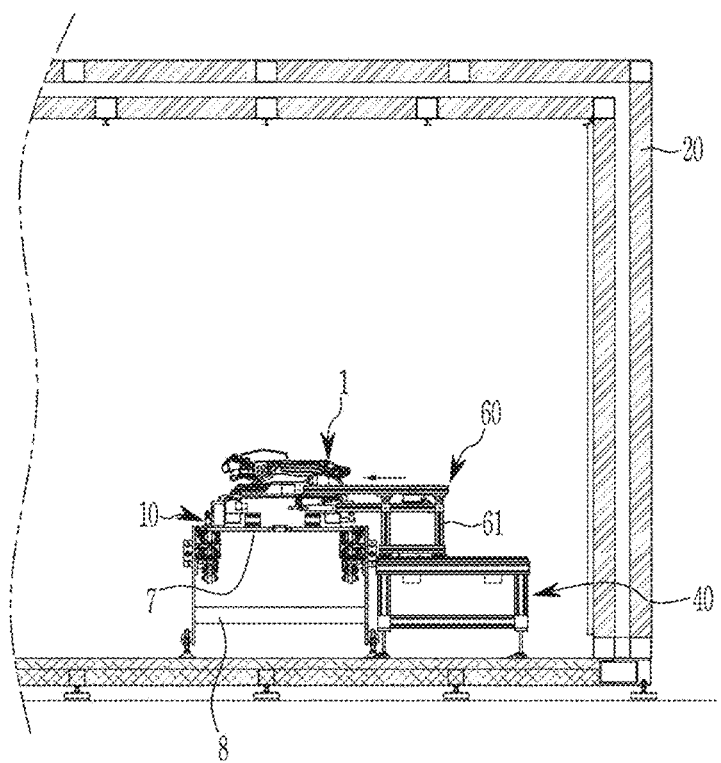

Subsequently at step S17, as shown in FIG. 11 and FIG. 12, the power supply portion 50 is moved forward toward the seat assembly 1 by the operation of the second driving portion 51. Thus, the power supply portion 50 is connected to the power supply connector 15 of the seat loading jig 10.

Then, at step S18, the movable frame 61 of the noise detection unit 60 is moved toward the seat assembly 1 by the operation of by the third driving portion 71. Accordingly, the microphone 65 is positioned at the rear bottom center portion of the seat assembly 1 by the first supporting rod 63.

Subsequently at step S19, the pair of second supporting rods 67 is moved along the transfer path 9 by the operation of the fourth driving portion 81 in the direction of becoming closer. Accordingly, the vibration sensors 69 mounted at the second supporting rods 67 contact both lower end central portions of the seat assembly 1, respectively.

In this embodiment, the vibration sensors 69 may be moved downward by the operation of the fifth driving portion 82 and the vibration sensors 69 may contact the both lower end central portions of the seat assembly 1.

Subsequently at step S20, while the microphone 65 and the vibration sensor 69 of the noise detection unit 60 are set to predetermined positions, the power supplied from the power supply portion 50 is applied respective one of the seat motors 3 of the seat assembly 1 through the power supply connector 15 of the seat loading jig 10, so as to drive the corresponding seat motor 3.

Accordingly, at step S21, the noise data according to the operation of the seat motor 3 is acquired through the microphone 65 and then the acquired noise data are output to the controller 90. At the same time, vibration data according to the operation of the seat motor 3 are obtained through the vibration sensor 69 and then the vibration data are output to the controller 90.

Subsequently at step S22, based on comparison of the noise data (noise/vibration data) provided from the microphone 65 and the vibration sensor 69 to the predetermined reference data (noise/vibration data), the controller 90 determines whether the corresponding seat motor 3 is defective in noise.

At the step S22, based on comparison of the noise data the reference data, the controller 90 indicates whether the corresponding seat motor 3 is defective in noise through the display 91, e.g., as "OK" or "NG".

In the same way, the other seat motors 3 may be sequentially driven and the controller 90 may determine whether the other seat motors 3 are defective in noise.

In an embodiment, when the seat motor noise inspection of the seat assembly 1 is finished, the equipment such as the seat loading jig 10, the power supply portion 50, and the noise detection unit 60 are returned to original positions. The seat inlet 23 and the seat outlet 25 of the soundproof booth 20 are also opened by controlling the opening/closing door 21.

Subsequent, in an embodiment, the seat assembly 1 determined to be non-defective in noise is discharged through the seat outlet 25 to be transferred to a subsequent process. In addition, in an embodiment, the seat assembly 1 determined to be defective in noise is discharged through the seat outlet 25 and is transferred to a re-inspection process, ch that seat motor noise inspection may be performed again in the re-inspection section.

According to an apparatus and method for inspecting seat motor noise according to an embodiment, the seat assembly 1 assembled in a seat assembly process may be automatically inspected in a line of transferring the seat assembly for whether the seat assembly is defective in noise.

Therefore, in an embodiment, since seat motor noise inspection for the seat assembly 1 of a driver seat and a passenger seat may be simultaneously performed in line, the cycle time for seat production may be decreased. Also, motor noise defects of the seat assembly 1 may be minimized, Thus, claim cost due to seat motor noise is reduced.

In addition, in an embodiment, the noise data of the seat motors 3 is obtained through the noise detection unit 60, and whether the seat motors 3 are defective in noise may be determined based on the noise data. Therefore, accuracy of seat inspection may be enhanced.

Furthermore, in an embodiment, quantitative indicators for inspection standards may be provided, the foundation of a smart factory may be formed through unmanned inspection process, and seat inspection quality may be integrated.

While the present disclosure has been described in connection with what is presently considered to be practical embodiments, it should be understood that the present disclosure is not limited to the disclosed embodiments. On the contrary, it is intended to cover various modifications and equivalent arrangements included within the spirit and scope of the appended claims.

<Description of symbols>

| | |
|---|---|
| 1: seat assembly | 3: seat motor |
| 5: movable module | 7: conveyor |
| 8: conveyor support | 9: transfer path |
| 10: seat loading jig | 11: first driving portion |
| 13: smart tag | 15: power supply connector |
| 20: soundproof booth | 21: opening/closing door |
| 23: seat inlet | 25: seat outlet |
| 30: tag reader | 40: supporting frame |
| 41: supporting leg | 43: vibration-proof rubber block |
| 50: power supply portion | 51: second driving portion |
| 52, 83, 84: operation cylinder | 53: power supply pin |
| 60: noise detection unit | 61: movable frame |
| 62: first guide rail | 63: first supporting rod |

-continued

<Description of symbols>

| | |
|---|---|
| 65: microphone | 66: first mounting bracket |
| 67: second supporting rod | 68: second guide rail |
| 69: vibration sensor | 71: third driving portion |
| 72: second mounting bracket | 73: linear guide |
| 75: linear motor | 77: connection bracket |
| 81: fourth driving portion | 82: fifth driving portion |
| 85: operation rod | 90: controller |
| 91: display | 100: apparatus for inspecting seat motor noise |

What is claimed is:

1. An apparatus for inspecting seat motor noise, the apparatus comprising:
   a soundproof booth provided on a transfer path of a seat assembly and installed with an opening/closing door at both sides along a transfer direction of the seat assembly;
   a power supply portion provided within the soundproof booth and configured to apply power to respective seat motors of the seat assembly;
   a noise detection unit installed within the soundproof booth to be reciprocally movable along a front-rear direction of the seat assembly and configured to detect an operation noise of the seat motors; and
   a controller configured to determine whether the seat motors are defective in noise based on comparison of noise data detected by the noise detection unit to predetermined reference data.

2. The apparatus of claim 1, wherein the noise detection unit comprises:
   a microphone positioned at a rear bottom center portion of the seat assembly and configured to obtain the noise data according to the operation of the seat motors; and
   a vibration sensor provided to be reciprocally movable along the transfer path and configured to contact a lower end central portion of the seat assembly and to acquire vibration data according to the operation of the seat motors.

3. An apparatus for inspecting seat motor noise, the apparatus comprising:
   a seat loading jig installed to be movable in an up-down direction in a conveyor moving along a predetermined transfer path and configured to fixedly holding a seat assembly;
   a soundproof booth provided at a predetermined section of the transfer path and installed with an opening/closing door at both sides along a transfer direction of the seat assembly;
   a tag reader installed in a supporting member of the conveyor and configured to receive an output signal of a smart tag attached to the seat loading jig;
   a supporting frame installed within the soundproof booth at a predetermined interval from the transfer path;
   a power supply portion installed in the supporting frame to be reciprocally movable along a front-rear direction of the seat assembly and configured to supply power to seat motors of the seat assembly;
   a noise detection unit installed in the supporting frame to be reciprocally movable along the front-rear direction of the seat assembly and configured to detect an operation noise of the seat motors; and
   a controller configured to determine whether the seat motors are defective in noise based on comparison of noise data detected by the noise detection unit to predetermined reference data.

4. The apparatus of claim 3, wherein the seat loading jig is installed on the conveyor to be reciprocally movable in the up-down direction by a first driving portion.

5. The apparatus of claim 3, wherein the seat loading jig comprises a power supply connector electrically connected to the seat motors of the seat assembly.

6. The apparatus of claim 5, wherein the power supply portion is movable forward and rearward by a second driving portion provided in the supporting frame, and is electrically connected to the power supply connector of the seat loading jig through power supply pins.

7. The apparatus of claim 3, wherein the noise detection unit comprises:
   a microphone provided to be reciprocally movable along a direction perpendicular to the transfer path and configured to obtain the noise data according to the operation of the seat motors at a rear bottom center portion of the seat assembly; and
   a vibration sensor provided to be reciprocally movable along the transfer path and configured to contact a lower end central portion of the seat assembly and to acquire vibration data according to the operation of the seat motors.

8. The apparatus of claim 3, wherein the noise detection unit comprises:
   a movable frame installed in the supporting frame to be reciprocally movable along a direction perpendicular to the transfer path by a third driving portion;
   a first supporting rod fixedly installed to the movable frame;
   a microphone fixedly installed to an end of the first supporting rod;
   a pair of second supporting rods installed at both sides of the movable frame interposing the first supporting rod and to be reciprocally movable in a direction to become further away or closer to each other along the transfer path by a fourth driving portion; and
   a vibration sensor installed to an end of the second supporting rod.

9. The apparatus of claim 8, wherein the vibration sensor is installed at the end of the second supporting rod to be reciprocally movable in the up-down direction by a fifth driving portion.

10. The apparatus of claim 3, wherein the supporting frame comprises:
    a supporting leg configured to support a bottom of the soundproof booth; and
    a vibration-proof rubber block provided at the supporting leg.

11. A method for inspecting seat motor noise of a seat assembly being transferred in a line along a predetermined transfer path, the method comprising:
    inserting at least one seat assembly into a soundproof booth, the at least one seat assembly being loaded on a seat loading jig and being transferred together with the seat loading jig along the predetermined transfer path through a conveyor;
    moving a power supply portion forward by motorized driving toward the at least one seat assembly to supply power to seat motors of the at least one seat assembly;
    moving a noise detection unit along a front-rear direction of the seat assembly by motorized driving toward the at least one seat assembly to detect an operation noise of respective seat motors, and outputting noise data to a controller; and determining whether the seat motors are defective in noise based on comparison of the noise data to predetermined reference data.

12. The method of claim 11, wherein, in the inserting of the at least one seat assembly into a soundproof booth, a smart tag storing vehicle type information is attached to the seat loading jig.

13. The method of claim 12, wherein:
in the inserting of the at least one seat assembly into a soundproof booth, a wireless signal output from the smart tag is received and is output to the controller by a tag reader provided at a supporting member of the conveyor; and
when the at least one seat assembly loaded on the seat loading jig corresponds to a vehicle type to be inspected, which is analyzed by the controller based on the wireless signal, the transfer of the seat loading jig is stopped, both opening/closing doors of the soundproof booth are closed, and the seat loading jig is moved upward.

14. The method of claim 11, wherein, in the moving of the power supply portion, the power supply portion is connected to a power supply connector of the seat loading jig electrically connected to the seat motors of the at least one seat assembly.

15. The method of claim 11, wherein, in the moving of the noise detection unit, a microphone of the noise detection unit is positioned to a rear bottom center portion of the at least one seat assembly to obtain the noise data according to the operation of the seat motors and then the noise data are output to the controller.

16. The method of claim 15, wherein, in the moving of the noise detection unit, a vibration sensor of the noise detection unit is moved along the transfer path by motorized driving to contact each of both lower end central portions of the at least one seat assembly to acquire vibration data according to the operation of the seat motors and then the vibration data is output to the controller.

17. The method of claim 11, wherein, in the determining of whether the seat motors are defective, whether the seat motors are defective in noise is displayed through a display.

* * * * *